United States Patent
Han et al.

(10) Patent No.: US 11,717,750 B2
(45) Date of Patent: Aug. 8, 2023

(54) METHOD AND APPARATUS FOR PROVIDING DANCE GAME BASED ON RECOGNITION OF USER MOTION

(71) Applicant: KINETIC LAB INC., Seongnam-si (KR)

(72) Inventors: Man Hyung Han, Paju-si (KR); Ye Joon Rim, Seongnam-si (KR)

(73) Assignee: KINETIC LAB INC., Seongnam-si (KR)

( * ) Notice: Subject to any disclaimer, the term of this patent is extended or adjusted under 35 U.S.C. 154(b) by 122 days.

(21) Appl. No.: 17/155,733

(22) Filed: Jan. 22, 2021

(65) Prior Publication Data

US 2021/0138342 A1 May 13, 2021

Related U.S. Application Data

(63) Continuation of application No. PCT/KR2018/010340, filed on Sep. 5, 2018.

(30) Foreign Application Priority Data

Jul. 25, 2018 (KR) .......................... 10-2018-0086651

(51) Int. Cl.
*A63F 13/428* (2014.01)
*A63F 13/211* (2014.01)
(Continued)

(52) U.S. Cl.
CPC .......... *A63F 13/428* (2014.09); *A63F 13/211* (2014.09); *A63F 13/212* (2014.09); *A63F 13/54* (2014.09); *A63F 13/73* (2014.09)

(58) Field of Classification Search
CPC .... A63F 13/211; A63F 13/212; A63F 13/424; A63F 13/428; A63F 13/45; A63F 13/54; A63F 13/73; A63F 13/814
See application file for complete search history.

(56) References Cited

U.S. PATENT DOCUMENTS 9,358,456 B1 * 6/2016 Challinor ................ A63F 13/44
10,307,081 B2 * 6/2019 Nino ...................... A63F 13/218
(Continued)

FOREIGN PATENT DOCUMENTS

KR   1020040101299 A    12/2004
KR   1020100094601 A    8/2010
(Continued)

OTHER PUBLICATIONS

Dance Dance Revolution Universe (2007). Wikipedia, the free encyclopedia. Accessed Dec. 16, 2022. 6 pages. <https://en.wikipedia.org/wiki/Dance_Dance_Revolution_Universe#cite_note-5> (Year: 2022).*

(Continued)

*Primary Examiner* — William H McCulloch, Jr.
(74) *Attorney, Agent, or Firm* — Dinsmore & Shohl LLP; Yongsok Choi, Esq.

(57) ABSTRACT

According to an embodiment of the present invention, a method for providing a motion recognition dance game comprises the steps of: (a) displaying a sound source list provided from a server; (b) requesting the server for a motion video corresponding to one sound source selected by a user from the sound source list, and receiving the motion video and first motion data from the server; (c) playing back the motion video, receiving second motion data generated in real time from a motion recognition sensor worn on the body of the user, and comparing the second motion data with the first motion data; and (d) calculating a grade on the basis of a matching rate of the first and second motion data, wherein the sound source list includes sound sources previously stored in the user terminal.

17 Claims, 6 Drawing Sheets

1

(51) Int. Cl.
*A63F 13/212* (2014.01)
*A63F 13/54* (2014.01)
*A63F 13/73* (2014.01)

(56) References Cited

U.S. PATENT DOCUMENTS

| | | | | |
|---|---|---|---|---|
| 2002/0055383 | A1* | 5/2002 | Onda | A63F 13/212 463/36 |
| 2005/0102515 | A1 | 5/2005 | Dave et al. | |
| 2007/0105629 | A1* | 5/2007 | Toyama | A63B 21/4001 463/42 |
| 2007/0154872 | A1* | 7/2007 | Sako | A63B 69/0028 434/247 |
| 2008/0146302 | A1* | 6/2008 | Olsen | A63F 13/828 463/7 |
| 2010/0271302 | A1* | 10/2010 | Pering | A63F 13/211 345/161 |
| 2011/0077919 | A1* | 3/2011 | Lee | G06V 20/52 703/2 |
| 2011/0306398 | A1* | 12/2011 | Boch | A63F 13/52 463/7 |
| 2013/0072301 | A1* | 3/2013 | Mallinson | A63F 13/211 463/36 |
| 2013/0185003 | A1* | 7/2013 | Carbeck | A61B 5/6829 702/41 |
| 2013/0194182 | A1* | 8/2013 | Tarama | A63F 13/46 345/158 |
| 2014/0031123 | A1* | 1/2014 | Sarrafzadeh | A63F 13/428 463/36 |
| 2014/0111418 | A1* | 4/2014 | Lee | G06F 3/0346 345/156 |
| 2015/0359457 | A1* | 12/2015 | Blumenthal | A61B 5/1038 73/172 |
| 2016/0042652 | A1* | 2/2016 | Nagai | G06F 3/011 434/247 |
| 2021/0138342 | A1* | 5/2021 | Han | A63F 13/73 |

FOREIGN PATENT DOCUMENTS

| | | |
|---|---|---|
| KR | 1020160037858 A | 4/2016 |
| KR | 1020160093131 A | 8/2016 |
| KR | 1020180065955 A | 6/2018 |

OTHER PUBLICATIONS

International Search Report of PCT/KR2018/010340 dated Apr. 23, 2019.

* cited by examiner

METHOD AND APPARATUS FOR PROVIDING DANCE GAME BASED ON RECOGNITION OF USER MOTION

CROSS-REFERENCE TO RELATED APPLICATION

This application is a continuation of International Patent Application No. PCT/KR2018/010340 filed on Sep. 5, 2018, which claims priority to and the benefit of Korean Patent Application No. 10-2018-0086651 filed in the Korean Intellectual Property Office on Jul. 25, 2018, the entire contents of which are incorporated herein by reference.

BACKGROUND OF THE INVENTION

(a) Field of the Invention

The present disclosure relates to a method and an apparatus for providing a motion recognition dance game service including a game in which a dancing video of a professional dancer is provided to a user terminal and a score is calculated by using motion data received from a user wearing a motion recognition sensor who follows the dancing video.

(b) Description of the Related Art

Recently, with development of technology, various input devices for computing devices have been developed. In the related art, input devices such as keyboards, mouses, touch pads, and input devices for gaming have been widely used, but input devices for recognizing human motion are also expanding their range of use.

A method of using a product such as a camera, an infrared method, a method of attaching a sensor to a body of a user, or the like is widely used as a method of recognizing human motion. Among the methods, a method with a high recognition rate and little preference for place is a method of attaching a sensor to a human's body.

Recently, in a game industry, there is a situation in which a dancing game using a sensor attached to the body is emerging, but as with general rhythm games, there is a limitation that only sound sources for which a manufacturer's license has been paid can be provided.

SUMMARY OF THE INVENTION

The present disclosure is to solve problems in the related art described above, and an object of the present disclosure is to implement a game service in which a score corresponding to a matching rate of dance movements is calculated by receiving a dancing video corresponding to a sound source owned by a user and following a user wearing a motion recognition sensor for a dance performed by a professional dancer in the dancing video.

However, the technical problems to be solved by the present embodiment is not limited to the technical problems described above, and other technical problems may exist.

According to an embodiment of the present disclosure, there is provided a method of providing a motion recognition dance game service performed by a user terminal including (a) displaying a sound source list provided from a server; (b) requesting a motion video corresponding to any one sound source selected by a user in the sound source list for the server, and receiving the motion video and first motion data from the server; (c) replaying the motion video, receiving second motion data generated in real time from a motion recognition sensor worn on a body of the user, and comparing a received result with the first motion data; and (d) calculating a grade based on a matching rate of the first motion data and the second motion data, in which the sound source list includes the sound source previously stored in the user terminal, and the motion video is a dancing video for the sound source of a dancer wearing the same type of the motion recognition sensor as the motion recognition sensor worn by the user.

According to another embodiment of the present disclosure, there is provided an apparatus for providing a motion recognition dance game service including a memory in which a program of providing a motion recognition dance game service is stored; and a processor of executing the motion recognition dance game service by executing the program stored in the memory, in which the processor displays a sound source list provided from a server, requests a motion video corresponding to any one of sound sources selected by a user in the sound source list for the server, receives the motion video and the first motion data from the server, replays the motion video, compares a result obtained by receiving second motion data generated in real time from a motion recognition sensor worn on a body of a user with the first motion data, and calculates a grade based on a matching rate of the first motion data and the second motion data, the sound source list includes the sound source previously stored in the user terminal, the motion video is a dancing video for the sound source of a dancer wearing the motion recognition sensor of the same type of the motion recognition sensor worn by the user, and the motion data is configured with an acceleration value and an angular velocity value generated versus time during a replaying time of a specific sound source.

According to another embodiment of the present disclosure, there is provided a method of providing a motion recognition dance game service performed by a server including (a) providing a sound source list according to request of a user terminal; (b) receiving request for a motion video corresponding to any one sound source selected by a user in the sound source list, and providing the motion video and first motion video data to the user terminal; and (c) receiving a result value obtained by the user taking a motion for the motion video from the user terminal, in which in the process (c), the user terminal replays the motion video, receives second motion data generated in real time from a motion recognition sensor worn on a body of the user, compares a received result with the first motion data, and calculates a result value based on a matching rate of the first motion data and the second motion data, the sound source list includes the sound source previously stored in the user terminal, the motion video is a dancing video for the sound source of a dancer wearing the motion recognition sensor of the same type of the motion recognition sensor worn by the user, and the motion data is configured with an acceleration value and an angular velocity value generated versus time during a replaying time of a specific sound source.

The present disclosure may implement a game service in which a dancing video corresponding to a sound source owned by a user is received, a dance performed by a professional dancer in the dancing video is identically followed by the user wearing a motion recognition sensor, and a score corresponding to a matching rate of dance movements is calculated.

Through this, a user may easily perform a dance practice on his own songs, and a game company providing a service may also easily provide a variety of songs to the user.

DETAILED DESCRIPTION OF THE EMBODIMENTS

Figure 1:
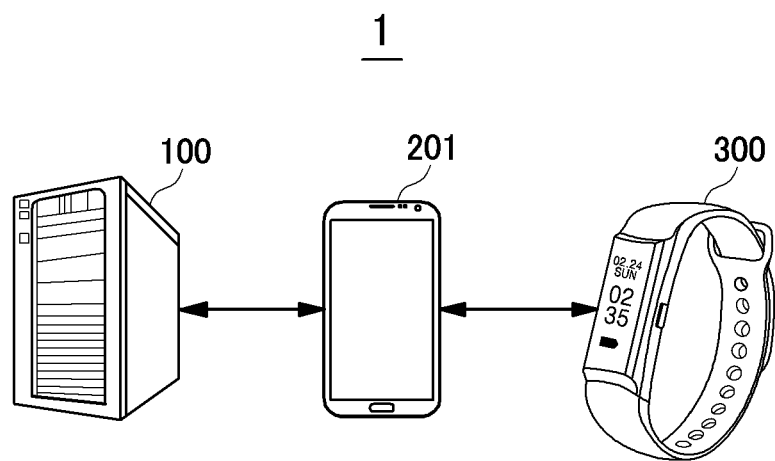
FIG. 1 is a diagram illustrating an entire system of providing a dance game service based on motion recognition according to an embodiment of the present disclosure.

Hereinafter, embodiments of the present disclosure will be described in detail with reference to the accompanying drawings so that those of ordinary skill in the art can easily implement the present disclosure. However, the present disclosure may be implemented in various different forms, and is not limited to the embodiments described herein. In the drawings, parts irrelevant to the description are omitted in order to clearly describe the present disclosure, and similar reference numerals are assigned to similar parts throughout the specification.

Throughout the specification, when a part is said to be "connected" with another part, this includes not only "directly connected" but also "electrically connected" with another element in the middle. In addition, when a part "includes" a certain component, it means that other components may be further included rather than excluding other components unless specifically stated to the contrary.

The following embodiments are detailed descriptions for aiding understanding of the present disclosure, and do not limit the scope of the present disclosure. Accordingly, inventions of the same scope performing the same function as the present disclosure will also belong to the scope of the present disclosure.

FIG. 1 is a diagram illustrating an entire system of providing a dance game service based on motion recognition according to an embodiment of the present disclosure.

Referring to FIG. 1, a system 1 of providing a dance game service based on motion recognition includes a server 100, a user terminal 200, and a motion recognition sensor 300.

The server 100 according to an embodiment of the present disclosure provides a motion video and first motion data in order to provide the dance game service based on the motion recognition through a terminal application mounted on the user terminal 200, and the user terminal 200 calculates a score (grade) with second motion data generated through the motion recognition sensor 300 based on the motion video and the first motion data provided from the server 100.

Here, the motion data is a motion value of a sound source of a dancer wearing the same type of motion recognition sensor as the motion recognition sensor 300 worn by a user, and the motion data may be motion data generated versus time during a replaying time of a specific sound source.

In addition, the server 100 provides a sound source list of providing the motion video and the first motion data to the user terminal 200, and the user terminal 200 may check the sound source corresponding to the sound source list among sound sources owned by the user terminal 200 and receive the selected motion video and first motion data.

The server 100 may provide an additional option to the user terminal 200 by downloading the sound source not owned by the user terminal 200 in addition to the sound source list, the motion video, and the first motion data.

The user terminal 200 may provide data provided from the server 100 to a user through an application of a dancing game service based on the motion recognition.

The user terminal 200 verifies the sound source that exists in common among the sound source list provided from the server 100 and the sound source held and assigns an identification mark to the sound source that is verified.

At this time, when a user receives a user input to receive a service through the sound source without the identification mark, the user terminal 200 may receive an option to download a corresponding sound source from the server 100.

In addition, a grade calculated by using a service or the sound source similar to information on a selected sound source may be recommended to the user.

The application of a dancing game service based on the motion recognition may be an application embedded in the user terminal 200 or an application downloaded from an application distribution server and installed in the user terminal 200.

The user terminals 200 refer to communication terminals that can use the terminal application in a wired or wireless communication environment. Here, the user terminal 200 may be a user's portable terminal. In FIG. 1, the user terminal 200 is shown as a smart phone, which is a kind of a portable terminal, but the spirit of the present disclosure is not limited thereto, and as described above, a terminal mounted on the terminal application can be borrowed without limitation.

To explain this in more detail, the user terminal 200 may include a handheld computing device (for example, PDA, email client, and the like), any form of mobile phone, or any form of other kind of computing or communication platform, but the present disclosure is not limited thereto.

The motion recognition sensor 300 is a type of sensor that is worn on a body of the user and measures a generated acceleration value and a generated angular velocity value corresponding to a user's movement and may be connected to the user terminal 200 before a service is provided. Here, the motion data may be configured with acceleration value and an angular velocity value of 3-axis.

When a user receives a service and starts moving, a motion recognition value generated in real time is provided to the user terminal 200 as the second motion data.

The motion recognition sensor 300 may be provided in various forms such as a bracelet and a handheld form that can be held on a hand, a glove or anklet, or on the body of the user. As an additional embodiment, the user terminal 200 may perform a role of the motion recognition sensor 300 to generate the second motion data.

In this case, the user has to memorize a dancer's movement provided in the motion video in advance or has to provide an additional display module to output a screen output on the display module of the user terminal 200.

Meanwhile, a communication network serves to connect the server 100 and the user terminal 200. That is, the communication network refers to a communication network that provides an access path so that the user terminals 200 can transmit and receive data after accessing the server 100. The communication network may include, for example, wired networks such as Local Area Networks (LANs), Wide Area Networks (WANs), Metropolitan Area Networks (MANs), and Integrated Service Digital Networks (ISDNs), or wireless networks such as wireless LANs, CDMA, Bluetooth, and satellite communications, but the scope of the present disclosure is not limited thereto.

Figure 2:
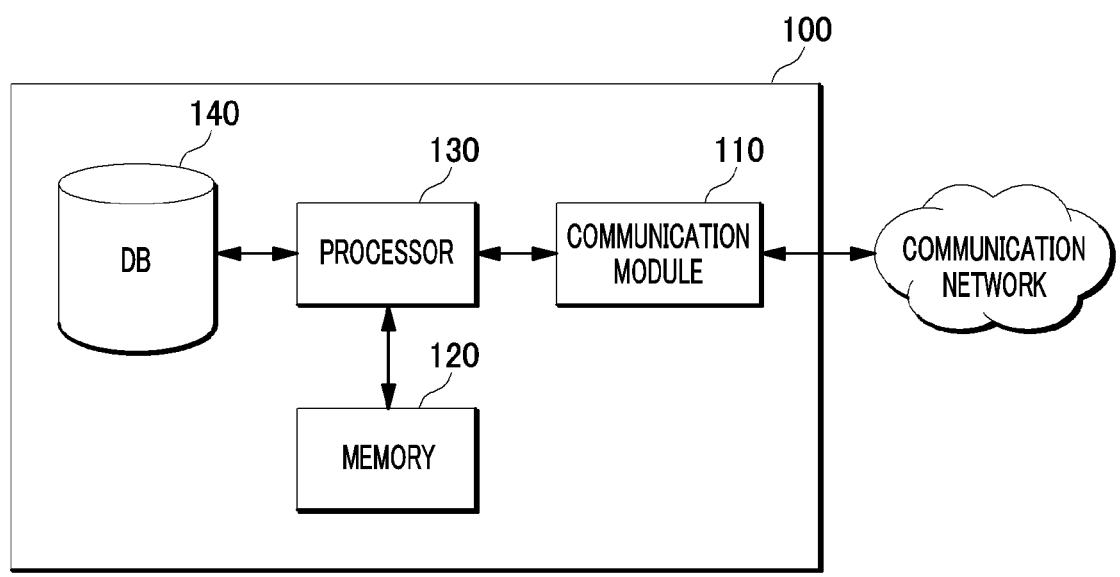
FIG. 2 is a diagram illustrating a configuration of a user terminal according to an embodiment of the present disclosure.

FIG. 2 is a diagram illustrating a configuration of the user terminal according to an embodiment of the present disclosure.

Referring to FIG. 2, the user terminal 200 includes a communication module 210, a memory 220, a processor 230, a database 240, and a display module 250.

In detail, the communication module 210 provides a communication interface necessary for providing transmission and reception signals between the server 100 and the user terminal 200 in a form of packet data in connection with the communication network. Further, the communication module 210 may receive a data request from the server 100 and transmit data as a response thereto.

Here, the communication module 210 may be a device including hardware and software necessary for transmitting and receiving a signal such as a control signal and a data signal through a wired or wireless connection with another network device.

In the memory 220, a program for performing a method of providing a dance game service based on the motion recognition is recorded. In addition, the memory performs a function of temporarily or permanently storing data processed by the processor 230. Here, the memory 220 may include a magnetic storage medium or a flash storage medium, but the scope of the present disclosure is not limited thereto.

The processor 230 is a kind of central processing unit and controls the entire process of providing a dance game service based on the motion recognition. Each step performed by the processor 230 will be described below with reference to FIG. 4.

Here, the processor 230 may include all types of devices capable of processing data, such as a processor. Here, for example, a "processor" may refer to a data processing device embedded in hardware, having a circuit physically structured to perform a function represented by a code or instruction included in a program. As an example of the data processing device embedded in the hardware, there are processing devices such as microprocessors, central processing units (CPU), processor cores, multiprocessors, application-specific integrated circuits (ASICs), and field programmable gate arrays (FPGA), but the scope of the present disclosure is not limited thereto.

The database 240 may store the sound source previously owned by the user, and store the sound source list, the sound source, the motion video, and the first motion data provided by the server 100 when it is necessary for providing a service.

In addition, a user's service usage record may be saved and compared with a user's usage record later.

As a further embodiment, the user terminal 200 receives the sound source by interworking with an external sound source streaming server, and, at this time, the service may be operated based on the received sound source.

The display module 250 performs a function for displaying an execution screen of the application of a dance game service based on the motion recognition. The user uses a service through an interface or the motion video provided through the display module 250. An embodiment corresponding to an execution screen of a dance game service based on the motion recognition will be described below with reference to FIG. 6.

Figure 3:
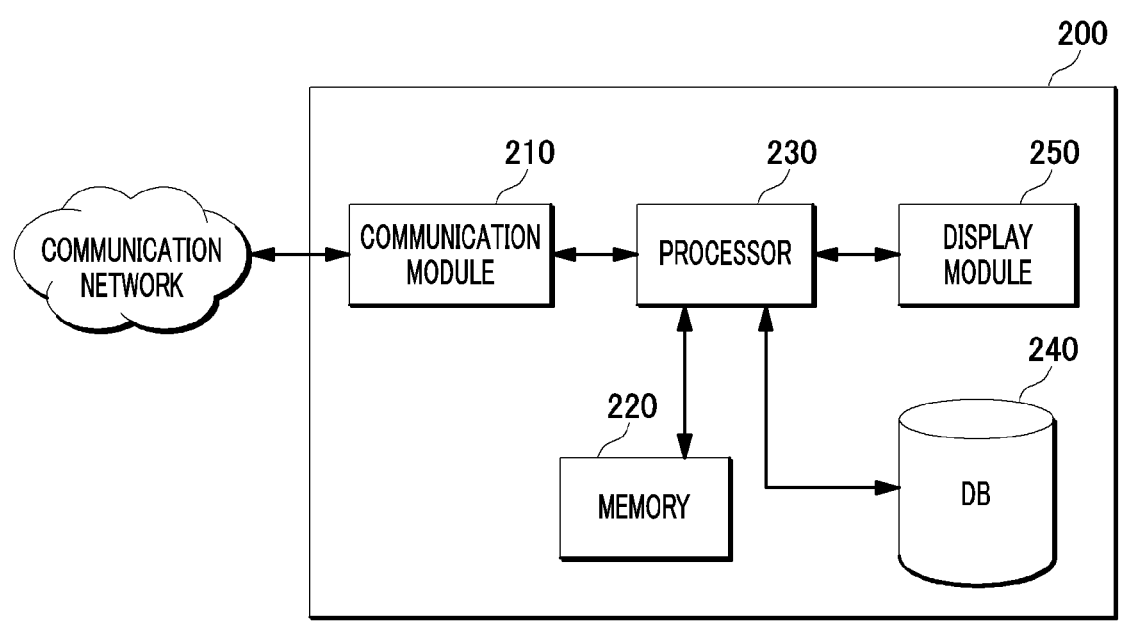
FIG. 3 is a diagram illustrating a configuration of a server according to an embodiment of the present disclosure.

FIG. 3 is a diagram illustrating a configuration of the server according to an embodiment of the present disclosure.

Referring to FIG. 3, the server 100 includes a communication module 110, a memory 120, a processor 130, and a database 140.

For the communication module 110, the memory 120, and the processor 130, the description overlapping the description of the communication module 210, the memory 220, and the processor 230 described above with reference to FIG. 2 will be omitted.

In detail, the communication module 110 provides a communication interface necessary for providing transmission and reception signals between the server 100 and the user terminal 200 in a form of packet data in connection with a communication network. Furthermore, the communication module 110 may transmit a data request to the user terminal 200 and receive data in response thereto.

In the memory 120, a program for performing a method of providing a dance game service based on the motion recognition is recorded. In addition, a function of temporarily or permanently storing data processed by the processor 130 is performed.

At this time, the memory 120 and a program for performing the method of providing a dance game service based on the motion recognition recorded in the memory 120 may be different from each other.

The processor 130 is a kind of central processing unit and controls the entire process of providing a dance game service based on the motion recognition.

The database 140 may store the sound source list, the motion video, and the first motion data provided to the user terminal 200. In an optional embodiment, the score (grade) obtained by the user terminal 200 may be stored and shared with other users in order to compete with other users.

Figure 4:
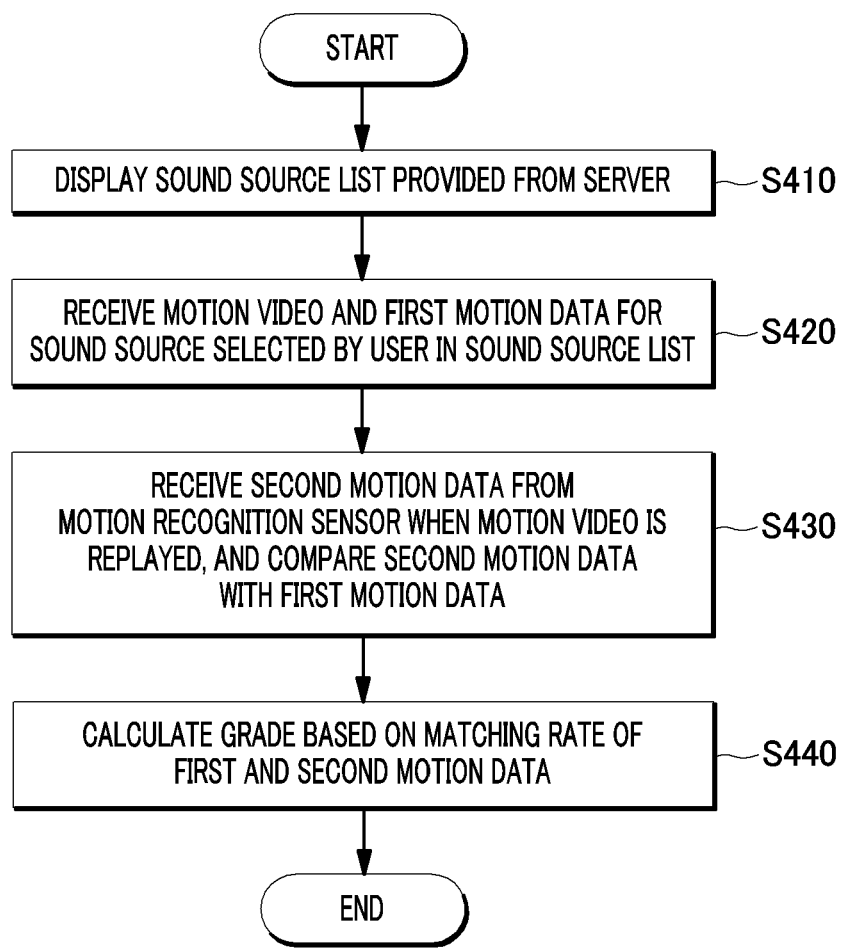
FIG. 4 is an operation flow chart illustrating a method of providing a dance game service based on the motion recognition according to an embodiment of the present disclosure.

FIG. 4 is an operation flow chart illustrating a method of providing a dance game service based on the motion recognition according to an embodiment of the present disclosure.

Referring to FIG. 4, first, the user terminal 200 receives the sound source list from the server 100 and displays the sound source list through the display module 250 (S410).

At this time, in the sound source list provided from the server 100, the sound source that exists in common with the sound source previously stored in the user terminal 200 is verified, and an identification mark is assigned to the verified sound source. A process of verifying the sound source will be described in detail with reference to FIG. 5.

As briefly described above, when the user selects the sound source without the identification mark, the server 100 may provide an option to download the sound source to the user terminal 200.

The sound source list is provided to the user terminal 200 so that a plurality of sound sources are arranged and displayed according to a predetermined criterion, and an interface for identifying the sound source through the title or thumbnail image of the sound source is provided.

In addition, by the sound source list, an interface which can perform ordering, sorting, and grouping based on at least one or more conditions among a title, a singer (or producer), a genre, a replaying time, and a difficulty of performing a motion video corresponding to the sound source included in the sound source, may be provided to the user.

The motion video and the first motion data for the sound source selected by the user from the sound source list are received from the server 100 (S420).

At this time, when the user selects a plurality of the sound sources, the server 100 provides the motion video and the first motion data corresponding to the plurality of the sound sources one by one, but continuously provides the sound sources according to an order in which the user selects them.

In addition, as an additional embodiment, the plurality of the selected sound sources are randomly mixed and provided in correspondence with the motion video and the first motion data, thereby enhancing fun and tension for the user.

When the sound source and the motion video of the user terminal 200 are replayed together, the second motion data is received from the motion recognition sensor 300 and compared with the first motion data (S430).

At this time, before step S430, the user has to connect by pairing the motion recognition sensor 300 and the user terminal 200 in advance.

In addition, in a case where the motion video and the sound source corresponding to the motion video match and stored according to the passage of time, when the frequency waveform of the sound source previously stored in the user terminal 200 and the frequency waveform of the sound source corresponding to the motion video match each other, a step of replaying the motion video and the previously stored sound source may be further included.

That is, dance of a professional dancer in the motion video is replayed along with replaying of the sound source of the user, and the first and second motion data corresponding thereto are compared in real time. When a replaying time of the motion video and the replaying time of the sound source are inconsistent (when sound source is illegal download file and video is produced based on officially downloaded sound source file, there may be cases where replaying times of each other are inconsistent), a dancing timing of the dancer in the motion video and a melody timing of the sound source may be inconsistent. However, when the motion video and the sound source are reproduced at the moment when they are matched based on the waveform of the sound source as above, the dancing timing and the melody timing may be matched.

In addition, as another embodiment, when a song selected from the sound source list by the user does not exist in the user terminal 200, only motion video may be simply replayed in step S430.

A grade is calculated based on a matching rate of the first and second motion data (S440).

To explain this in detail, the sound source is calculated by dividing a section for each predetermined replaying time, and the grade is divided according to a predetermined method based on the matching rate for the first and second motion data included in each section.

At this time, the matching rate is calculated through a time difference between the first motion data and the second motion data or a difference between motion values (generated acceleration value and angular velocity value).

In addition, a final grade is calculated based on the grade calculated for each section. For example, the final grade is calculated by calculating the average of the grades calculated for each section.

As a further embodiment, a score for the matching rate of the entire sound source may be calculated without dividing each section. For example, a method of assigning a score of 100 points to the entire sound source and giving a deduction point whenever a difference occurs in the first and second motions to finally calculate the score, may be applied.

After all steps are completed, a user's athletic ability may be measured based on the grade for each section, and the sound source with a difficulty level suitable for an athletic ability may be recommended, and it is possible to further recommend a genre, a replaying time, the sound source having a predetermined similarity value, and the like.

Figure 5:
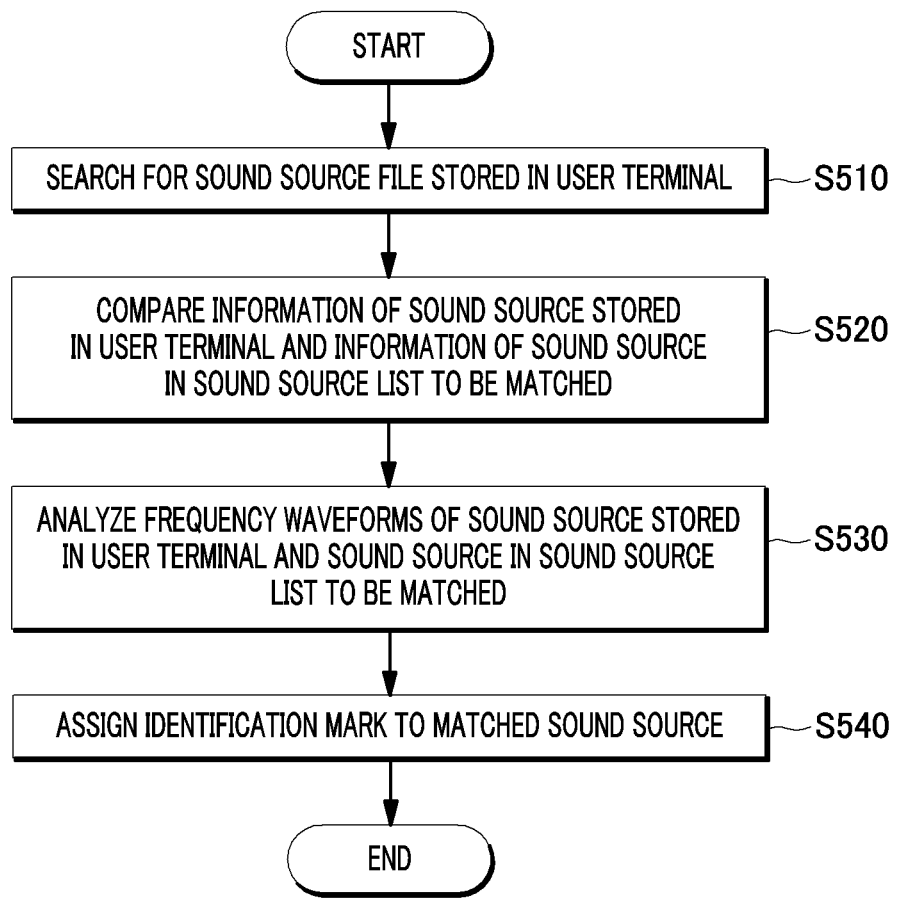
FIG. 5 is an operation flow chart illustrating a method for matching a sound source of a user terminal with the sound source of a server according to an embodiment of the present disclosure.

FIG. 5 is an operation flow chart illustrating a method of matching the sound source of the user terminal 200 with the sound source of the server 100 according to an embodiment of the present disclosure.

Referring to FIG. 5, the sound source stored in the user terminal 200 is searched based on the sound source list (S510).

This may be a verify operation on which sound source exists in the user terminal 200.

The sound source of the user terminal 200 searched through step S510 and information of the sound source included in the sound source list to be matched are compared (S520).

In detail, by comparing at least one of the sound source stored in the user terminal 200 and the name of the sound source included in the sound source registered in the sound source list, meta information of the sound source, and the replaying time of the sound source, verification for the sound source having the same value is performed.

At this time, in a case where at least one of the name and meta information of the sound source received from the server 100 match, but the replaying time does not match, it is regarded as an illegal sound source and a recommendation message for downloading an official sound source may be provided to the user terminal 200.

When verification for the sound source is not performed even through step S530, the verification is performed by analyzing a frequency waveform of the sound source included in the sound source list to be matched with the sound source stored in the user terminal 200 (S530).

When it is determined that there is a difference within a predetermined range by analyzing the frequency waveform of the sound source in the user terminal 200 searched in step S510 and analyzing the frequency waveform of the sound source received from the server 100 and the maximum, minimum and average values of the analyzed frequency waveform, it is regarded that the same sound source as the sound source received from the server 100.

After the above-described three steps, the identification mark is assigned to the verified sound source (S540).

Figure 6:
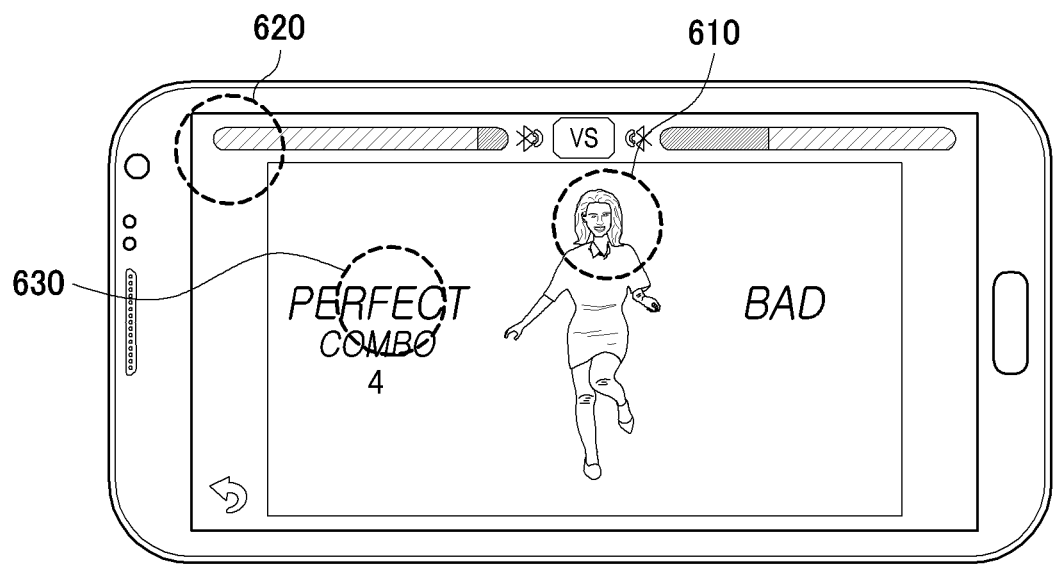
FIG. 6 is a diagram illustrating an example of a screen of the dance game service based on the motion recognition according to an embodiment of the present disclosure.

FIG. 6 is a diagram illustrating a screen example of a dance game service based on the motion recognition according to an embodiment of the present disclosure.

Referring to FIG. 6, in an example of a screen that may be provided through a display module 250 of the user terminal 200, dance information 610, a real-time grade 620, and a matching state 630 may be verified.

The dance information 610 may be included in the motion video, and may be information generated by the professional dancer to inform a user of a dance method. At this time, the professional dancer also wears the motion recognition sensor 300 to dance, and the user follows the movement of the professional dancer with eyes and dances.

The real-time grade 620 may be an interface of providing the real-time grade 620 to the user based on the matching rate between the first motion data received from the server 100 by the user terminal 200 and the second motion data received from the motion recognition sensor 300.

Although shown in a form of a bar graph on the drawing, it may be expressed in various ways such as numbers and symbols.

For example, the matching state 630 may be information on the matching rate of the first and second motion data at a specific moment. For example, when there is little difference in the matching rate based on a predetermined value, "Perfect" is output, when there is a slight difference, "Good", and when the difference is more than a predetermined value, "Bad" is displayed to increase user interest, so that it is possible to verify which part of the sound source is wrong.

As an example of a service screen shown through FIG. 6, since the shape or location structure of the interface may vary, the scope of the present disclosure is not limited. However, the dance information 610 has to be delivered in real time so that the user can follow it.

An embodiment of the present disclosure may also be implemented in the form of a recording medium including instructions executable by a computer, such as a program module executed by a computer. Computer-readable media can be any available media that can be accessed by a computer, and includes both volatile and nonvolatile media, removable and non-removable media. In addition, the computer-readable media may include computer storage media. Computer storage media includes both volatile and nonvolatile, removable and non-removable media implemented in any method or technology for storage of information such as computer readable instructions, data structures, program modules or other data.

Although the methods and systems of the present disclosure have been described in connection with specific embodiments, some or all of their components or operations may be implemented using a computer system having a general-purpose hardware architecture.

The above description of the present disclosure is for illustrative purposes only, and those of ordinary skill in the art to which the present disclosure pertains will be able to understand that other specific forms can be easily modified without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

The scope of the present disclosure is indicated by the claims to be described later rather than the detailed description, and all changes or modified forms derived from the meaning and scope of the claims and their equivalent concepts should be interpreted as being included in the scope of the present disclosure.

What is claimed is:

1. A method of providing a motion recognition dance game service performed by a user terminal, the method comprising:
   (a) displaying a sound source list provided from a server;
   (b) requesting a motion video corresponding to any one sound source selected by a user in the sound source list for the server, and receiving the motion video and first motion data from the server;
   (c) replaying the motion video received from the server and the sound source selected by the user and previously stored in the user terminal together, receiving second motion data generated in real time from a motion recognition sensor worn on a body of the user, and comparing the second motion data with the first motion data; and
   (d) calculating a grade based on a matching rate of the first motion data and the second motion data, wherein the motion video is a dancing video for the sound source of a dancer wearing the same type of the motion recognition sensor as the motion recognition sensor worn by the user, the first motion data is generated from the motion recognition sensor worn on a body of a dancer while the sound source is replayed, and the motion video is produced to have the same time as a replaying time of the sound source.

2. The method of claim 1, wherein,
when the sound source selected by the user is not previously stored in the user terminal, only the motion video is replayed.

3. The method of claim 1, wherein, in the process (a),
the sound source list provided from the server and the sound source that is in common with the sound source previously stored in the user terminal are verified and an identification mark is assigned to the sound source that is verified.

4. The method of claim 3, wherein,
when a user input for selecting the sound source without the identification mark is received, an option for the user terminal to download the sound source from the server, is provided.

5. The method of claim 3, wherein,
verification is performed on the sound source having the same value by comparing the sound source stored in the user terminal with at least one of a name of the sound source, meta information of the sound source, a replaying time of the sound source, and a frequency waveform of the sound source included in the sound source registered in the sound source list, and the meta information is unique information including a singer name, a genre, a production company, a composer, an arranger, and a lyricist.

6. The method of claim 5, wherein,
after searching for a name of the sound source in priority, when the same sound source is not searched, the searching is performed based on the meta information and the replaying time.

7. The method of claim 6, wherein,
when at least one of the name of the sound source and the meta information received from the server matches, but the replaying time does not match, it is regarded as an illegal sound source, and a message recommending that an official sound source can be downloaded, is provided.

8. The method of claim 5, wherein,
a process in which the sound source is verified according to the frequency waveform, includes searching the sound source stored in the user terminal, analyzing the frequency waveform of the searched sound source, and giving a separate identification mark by regarding the same sound source as the sound source received from the server, when there is a difference within a predetermined range by analyzing the frequency waveform of the sound source received from the server and maximum, minimum, and average values of the analyzed frequency waveform.

9. The method of claim 1, wherein, in the process (a),
the sound source list is provided to the user terminal so that a plurality of the sound sources are arranged and displayed according to a predetermined criterion, and an interface for identifying the sound source through a title or thumbnail image of the sound source, is provided.

10. The method of claim 9, wherein,
an interface which can perform ordering, sorting, and grouping for the sound source list based on at least one or more conditions among a title, a singer or producer, a genre, a replaying time, and a difficulty of performing a motion video corresponding to the sound source included in the sound source, is provided.

11. The method of claim 1, wherein, in the process (b), when the user selects a plurality of sound sources, the server provides the motion videos corresponding to the plurality of sound sources one by one, and provides the sound source in an order selected by the user.

12. The method of claim 1, wherein, before the process (c), further comprising:
connecting the motion recognition sensor that is worn on a body of the user and measures an acceleration value and an angular velocity value corresponding to movement of the user to the user terminal.

13. The method of claim 1, wherein, in the process (c), further comprising:
replaying the motion video and a previously stored sound source at a moment when a frequency waveform of the sound source previously stored in the user terminal and a frequency waveform of the sound source corresponding to the motion video match each other, in a case where the motion video and the sound source corresponding to the motion video match and stored according to passage of time.

14. The method of claim 1, wherein, in the process (d),
the grade is calculated by dividing the sound source into a section for each predetermined replaying time, and
the grade is divided according to a predetermined method based on the matching rate for the first motion data and the second motion data including each section, and a final grade is calculated based on the grade calculated for each section after the replaying of the motion video.

15. The method of claim 14, wherein,
a result obtained by dividing the grade and the final grade for each section is provided to the user.

16. The method of claim 15, wherein,
an athletic ability of the user is measured based on the grade for each section and the sound source of a difficulty level suitable for the athletic ability is recommended.

17. The method of claim 1, wherein, after the process (d),
the sound source having a genre, a replaying time, and a predetermined similarity value of the sound source corresponding to the motion video received by selecting previously by the user, is recommended.

\* \* \* \* \*